United States Patent [19]

Waddington

[11] 4,276,784
[45] Jul. 7, 1981

[54] STEPLESS, VARIABLE STROKE DRIVE HAVING A NON-ROTATING CAM

[75] Inventor: Clive Waddington, Stratford, Conn.
[73] Assignee: Avco Corporation, Stratford, Conn.
[21] Appl. No.: 77,205
[22] Filed: Sep. 20, 1979

Related U.S. Application Data

[62] Division of Ser. No. 836,727, Sep. 26, 1977, Pat. No. 4,181,043.

[51] Int. Cl.³ ............................ F16H 5/42; F16H 5/60
[52] U.S. Cl. .................................. 74/336 R
[58] Field of Search .............. 74/217 B, 335, 336 R, 74/336 B, 336.5, 337, 750 B, 781 B

[56] References Cited

U.S. PATENT DOCUMENTS

| | | | |
|---|---|---|---|
| 2,956,44m | 10/1960 | Nelson | 74/336.5 |
| 2,230,293 | 2/1941 | Harris | 74/336 B |
| 2,485,002 | 11/1949 | Thomas | 74/217 B |
| 3,215,921 | 11/1965 | Smith et al. | 74/337 |
| 3,465,606 | 9/1969 | Ashner | 74/217 B |
| 3,699,826 | 10/1972 | Lumb | 74/752 E |
| 3,769,848 | 11/1973 | McGuire | 74/217 B |
| 3,830,521 | 8/1974 | Gardel et al. | 74/217 B |

Primary Examiner—Lawrence J. Staab
Attorney, Agent, or Firm—Ralph D. Gelling

[57] ABSTRACT

A stepless variable stroke drive particularly suitable for a bicycle transmission has a crank driven input element comprising a carrier housing journaled for rotation on a spindle. Mounted within the carrier, journaled on individual axles, radially spaced to the spindle, are four planet gears which engage an output sun gear. Recessed into one side of each planet gear is a concentric channel whose outer circumference is constructed with ratchet teeth and whose inner circumference journals a crank ring having pawls for engaging the ratchet teeth. The ring also has a follower which engages a cylindrical cam channel fixed on and adjustable to various eccentricities relative to the spindle. As the carrier housing rotates, the crank ring follower engages the cam channel causing the crank rings to angularly oscillate at an amplitude proportional to the cam channel eccentricity. Sequential intermittent engagement of the crank ring pawls with the planet gear ratchet teeth during a portion of each carrier revolution drives the sun gear at a constant speed which is a multiple of the input speed dependent on the cam eccentricity.

In another embodiment, the crank ring is eliminated and the planet gears each have a follower for engaging the eccentric cam channel. The carrier housing has slots for the planet gear axles which allow the planet gear to sequentially move to engage and disengage the sun gear for a selected portion of each planet gear's oscillation to accomplish a speed increase, decrease or reversal. Alternate manual and automatic controls are provided for both embodiments to adjust the cam channel eccentricity.

1 Claim, 11 Drawing Figures

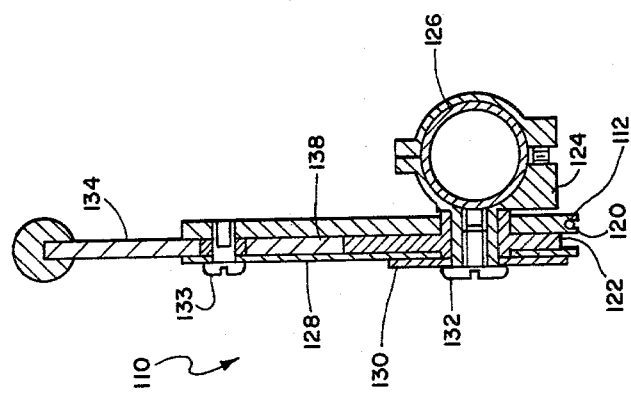
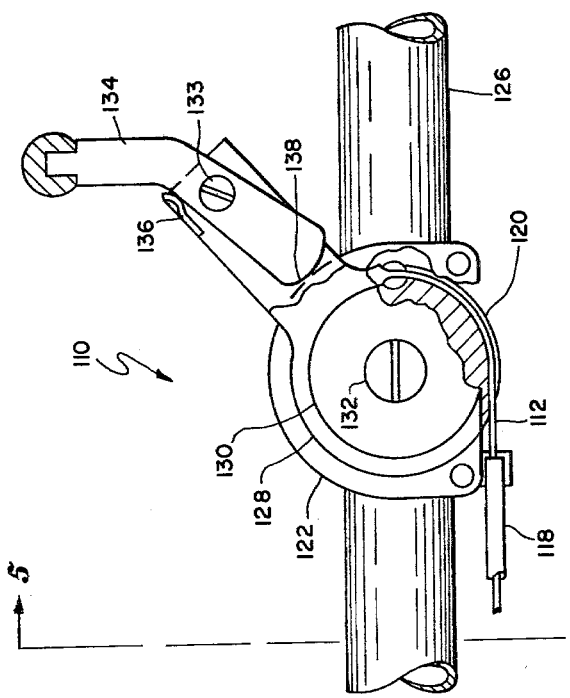

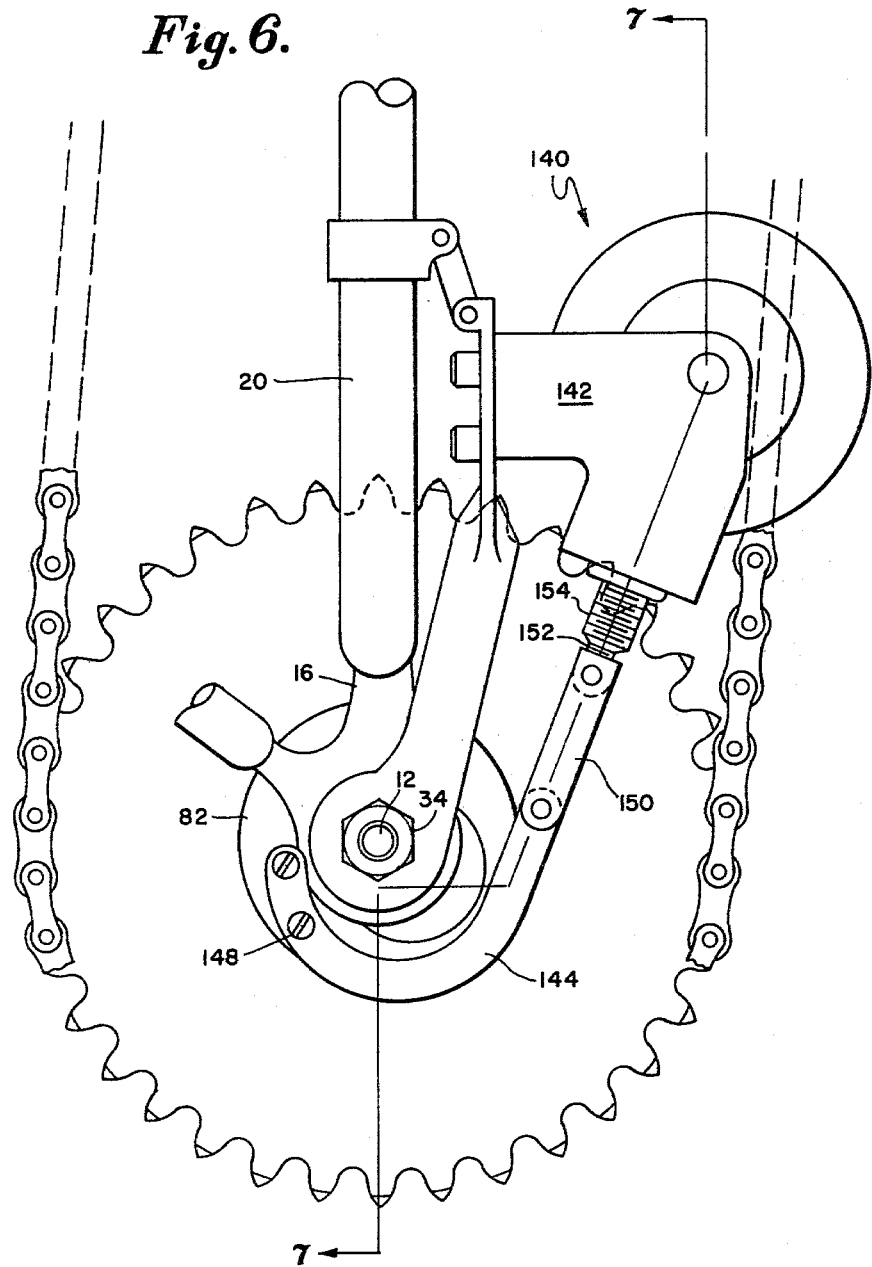

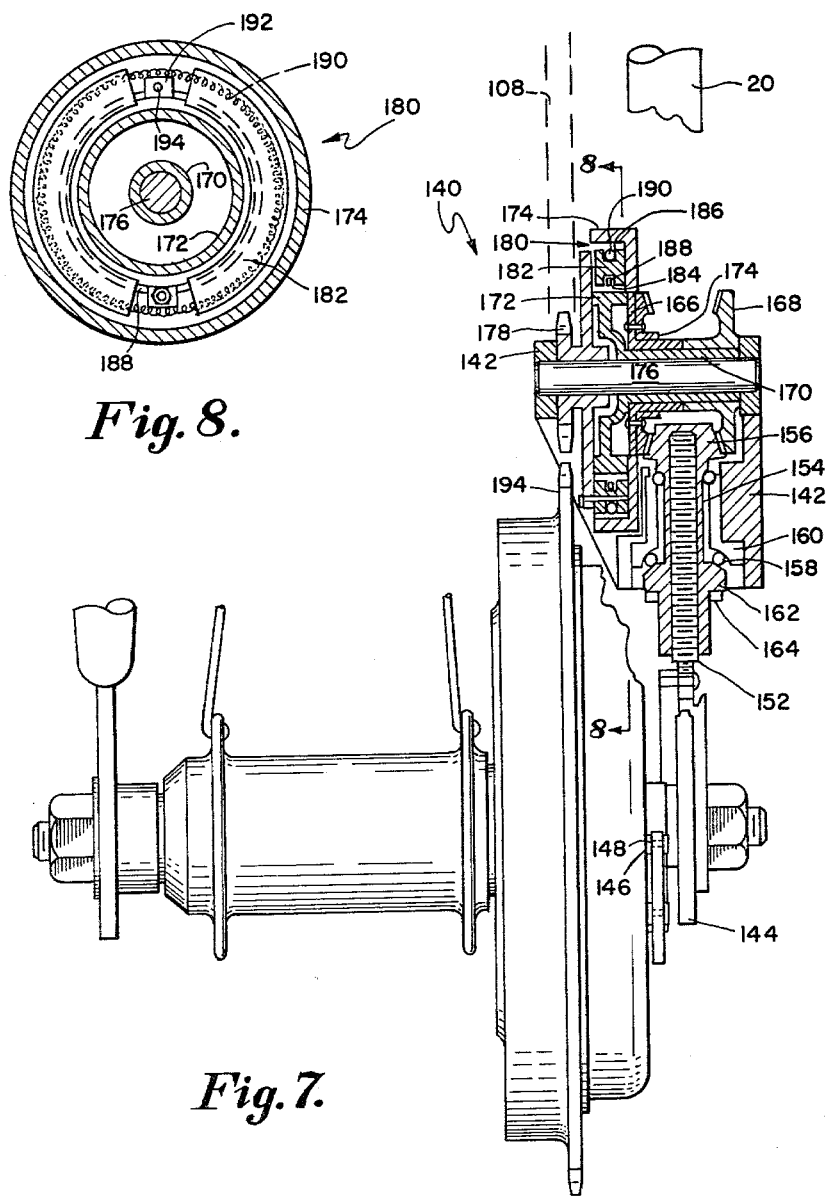

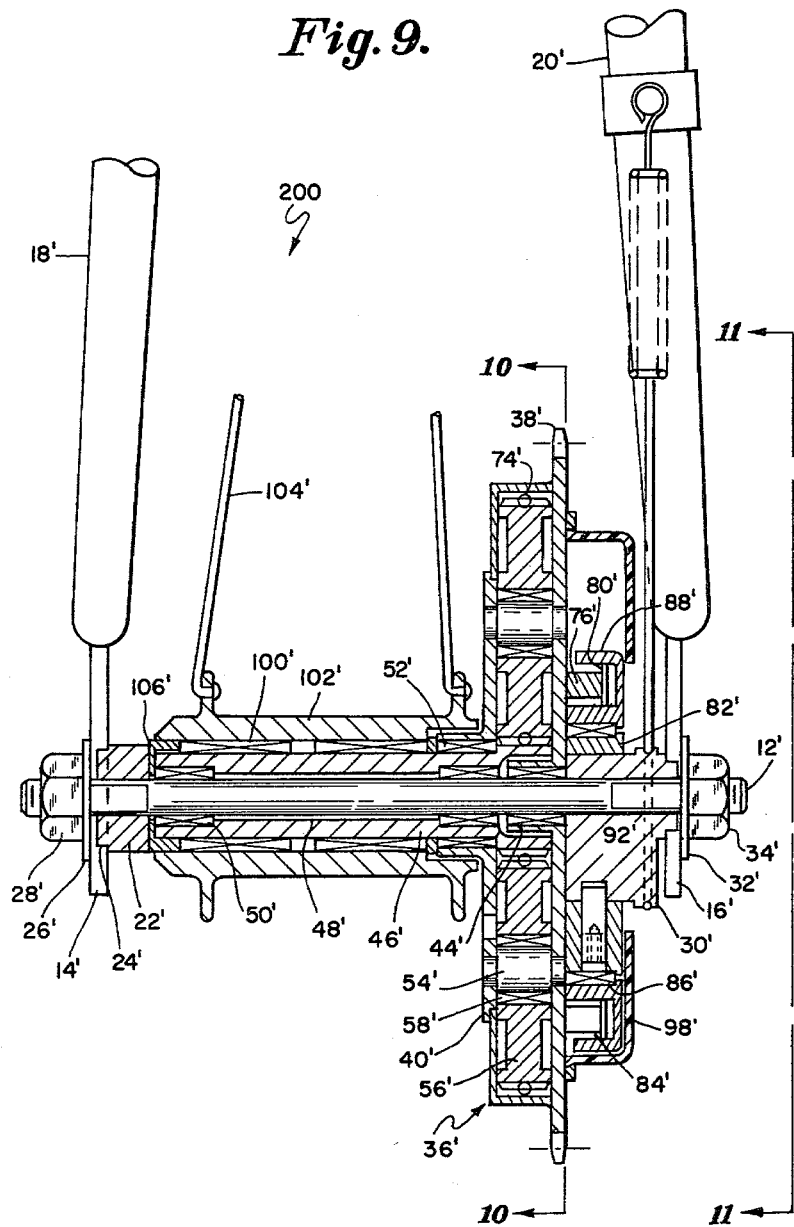

STEPLESS, VARIABLE STROKE DRIVE HAVING A NON-ROTATING CAM

This is a division of application Ser. No. 836,727 filed Sept. 26, 1977 now U.S. Pat. No. 4,181,043.

BACKGROUND OF THE INVENTION

My invention relates in general to drives and more particularly to stepless, variable ratio drives employing a variable stroke mechanism.

An important advance in the use of variable stroke drives for automatic transmissions was the Waddington drive described in U.S. Pat. Nos. 3,803,932 and 3,874,253, and in pending U.S. patent application No. 737,632. The Waddington drive of these earlier descriptions employed a cam which rotated at the input speed to the drive and which was automatically controlled to assume various eccentricities relative to the center of input rotation in order to vary the stroke and thereby the torque ratio of the drive. The instant invention also utilizes a variable stroke drive, but has the feature of a nonrotating cam which allows manual control of the cam eccentricity to regulate the stroke and torque ratio of the drive. The manual control capability is desirable in some situations as, for example, when the drive is used for a bicycle transmission. The manual control would accommodate cyclists who would prefer to manipulate the control themselves to suit their particular needs. Indeed the drive is particularly attractive for use as a bicycle transmission because of its compactness, light weight, moderate cost and immediate adaptability to existing bicycle frames. The earlier Waddington drives were either somewhat heavier because they operated at slow input speed and utilized large overrunning clutches, or required some modification to the standard bicycle frame to incorporate an input speed stepup mechanism.

SUMMARY OF THE INVENTION

The invention is a variable stroke drive wherein the input element comprises a crank driven carrier housing journaled for rotation on a spindle. In the carrier, journaled on individual axles, are four planet gears which mesh with a sun gear. Recessed into one side of each planet gear is a concentric channel with ratchet teeth in its outer circumference. Journaled on the inner circumference of the channel is a crank ring having several pawls to engage the ratchet teeth. The crank ring also has a follower which engages a cylindrical cam channel fixed on and adjustable to various eccentricities relative to the spindle center. Rotation of the carrier housing by the input means imparts to the crank ring an angular oscillation of an amplitude proportional to the eccentricity of the cam channel. As a crank ring is carried around that quarter of a carrier revolution where it is oscillated at highest angular velocities in a direction opposite to the carrier rotation, the pawls of the ring engage the planet gear ratchet teeth and cause rotation of the planet. The sequential engagement of the rings and planets drives the sun gear at a substantially constant output speed which is a multiple of the input speed and is dependent on the cam eccentricity.

Another embodiment of the invention eliminates the crank rings and ratchet teeth. Instead, the planets are provided with a follower which engages the cam channel and oscillates the planets. Provided in the carrier housing are slots for the planet axles which allow the planets sequentially to move to engage and disengage the sun gear during a selected portion of the carrier revolution to accomplish a speed increase, decrease or reversal.

The invention provides three alternate control mechanisms for adjusting the eccentricity of the cam to shift the drive's ratios. The first is a manually manipulated arrangement of lever and cable. The second is an automatic input speed control which utilizes centrifugal weights to engage an outer race when the input speed is above a predetermined value and an inner race when below another value. The races, through a gear arrangement, drive a screw which is linked to the cam. The third control is automatic and responds to the torque across the drive.

DESCRIPTION OF THE DRAWINGS

FIG. 4 is a side view, partly in section, of a manual control for shifting the transmission.
FIG. 5 is a section along the line 5—5 of FIG. 4.
FIG. 6 is an end view of the transmission with a torque ratio control sensitive to input speed which is part of the invention.
FIG. 7 is a section along the line 7—7 of FIG. 6.
FIG. 8 is a section along the line 8—8 of FIG. 6.
FIG. 9 is a side view in section of another embodiment of the invention as it may be applied for use as a bicycle transmission.

DETAILED DESCRIPTION OF THE INVENTION

Figure 1:
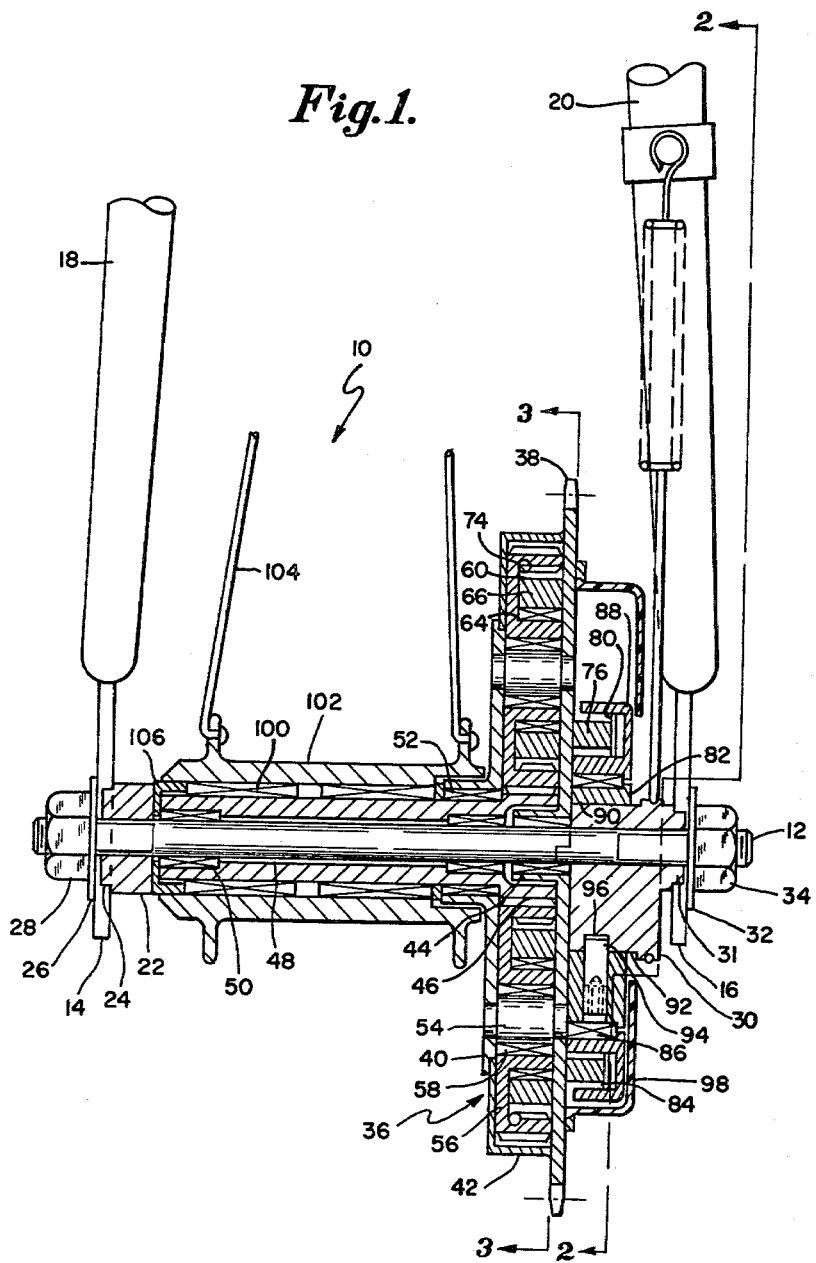
FIG. 1 is a side view in section of an embodiment of the invention as it may be applied for use as a bicycle transmission.
Figure 2:
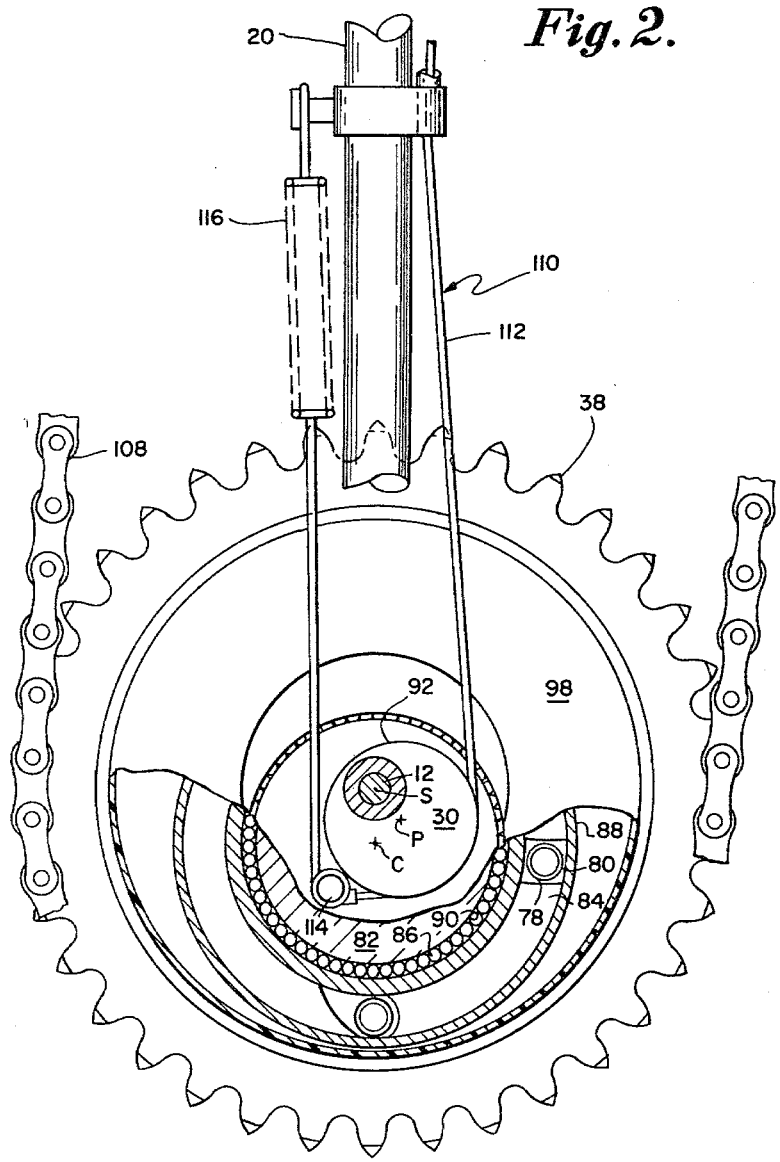
FIG. 2 is a section along the line 2—2 of FIG. 1.
Figure 3:
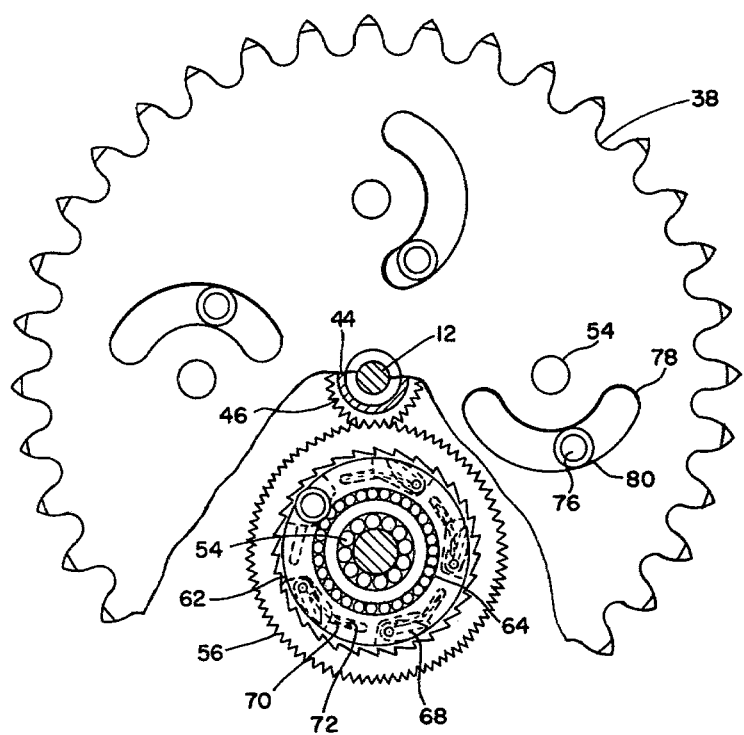
FIG. 3 is a section along the line 3—3 of FIG. 1.

As shown in FIGS. 1, 2 and 3, the transmission 10 is mounted by fixing its main spindle 12 in slotted left and right brackets 14 and 16 which are attached to the bicycle rear fork members 18 and 20.

Screwed on the left side of the spindle 12 is a nut 22 which is prevented from turning by its two flats 24 which snugly fit a recess in the left bracket 14. The bracket 14 is clamped between nut 22 and washer 26 by end nut 28.

Similarly screwed on the right side of spindle 12 is pivot hub 30 which is prevented from turning by its end flats 31 which fit into a recess in right bracket 16. The bracket 16 is clamped between the pivot hub 30 and washer 32 by end nut 34. The nut 22 and pivot hub 30 are just sufficiently spaced on spindle 12 for intermediate parts to turn freely.

Adjacent pivot hub 30 is a carrier assembly 36 comprised of a sprocket 38, a left side disk 40 and a cover 42. The sprocket 38 is journaled by a bearing 44 onto the spindle 12. An output sun gear 46 is journaled through its hollow shaft 48 onto spindle 12 by a pair of bearings 50. The carrier left side disk 40 is then journaled onto the shaft 48 by a bearing 52.

The carrier 36 retains four axles 54 on each of which is a planet gear 56 journaled by a bearing 58. The planets 56 have external teeth meshing with sun gear 46. Recessed into one side of each planet 56, concentric with the planet axle 54, is a channel 60. The outer circumference of the channel 60 has a number of ratchet teeth 62. The inner circumference supports a bearing 64 for journaling a crank ring 66 received by channel 60 on which are pivotally mounted several outward oriented pawls 68, shown in FIG. 3, to engage the ratchet teeth 62. Also in the crank ring 66, for each pawl 68, there is a small bore 70 which retains a cantilever spring 72 engaging a recess in its pawl 68 and urging the pawl 68 against the ratchet teeth 62. Retained in a recess in the outer circumference of the channel 60, protruding slightly beyond the ratchet teeth 62 is a resilient ring 74, seen in FIG. 1, on which the pawls 68 noiselessly ride when not engaged.

Each crank ring 66 has a crank pin 76 protruding through an arcuate slot 78 in the sprocket 38 as best seen in FIG. 3. Journaled on each crank pin 76 is a cylindrical follower 80 which follows a circular cam channel 84 constructed in cam plate 88. Cam plate 88 is in turn journaled onto cam plate axle 82 by bearings 86.

As seen in FIG. 2, the cam plate axle 82 has a circular, interior bore 90, the center P of which being offset from the geometric center C of the cam plate axle 82 and the center of the circular cam channel 84. By means of the bore 90, the cam plate axle 82 is itself journaled onto cylindrical surface 92 of the pivot hub 30. The center P of cylindrical surface 92 on the pivot hub 30 is offset from the spindle axis S by the same distance that the center of the interior bore 90 in the cam plate 88 is offset from the geometric center C of the cam plate axle 82. The cam plate axle 82 is rotatably adjustable from concentricity to varying eccentricities relative to the spindle 12 by pivoting about the center P of surface 92. In order to reduce the loads on the follower 80, cam plate 88 is freely rotatable on bearings 86.

Into the cam plate axle 82 is threaded a stop pin 94 which protrudes into a groove 96 angularly spanning 90° of cylindrical surface 92 of the pivot hub 30 in order to limit the adjustability of the cam plate axle 82. In FIG. 2 the center C of cam plate axle 82 is shown swung around the pivot hub center P to its maximum eccentricity relative to spindle center S. A plastic dust cover 98 is provided to protect the cam plate axle 82 and cam plate 88. The means employed for controlling the position of cam plate 88 will be described subsequently. An output wheel hub 102 is journaled onto the output sun gear shaft 48 by a pair of overrunning clutches 100. The hub retains spokes 104 for mounting a wheel (not shown) in the usual way. A washer 106 is interposed between the hub 102 and the nut 22.

In operation the sprocket 38 of the bicycle transmission 10 is rotated (clockwise as viewed in FIG. 2) by a chain 108 driven by a foot crank (not shown) having pedals manipulated by the cyclist. The planet axles 54, being mounted in the carrier 36, of which the sprocket 38 is a part, are rotated on the spindle 12. With the cam plate axle 82 positioned concentric to the spindle 12, the angular position of each follower 80 relative to its corresponding planet axle 54 is maintained throughout a revolution of the carrier 36. Therefore, the cranks 66 are motionless relative to the carrier 36. Because the planets 56 mesh with the output sun gear 46, and the sun gear 46 resists rotation because it is connected to the bicycle wheel, the planets 56 tend to rotate clockwise about their axles 54, but are prevented from such rotation by engagement of the pawls 68 with the ratchet teeth 62. The planets 56 are thereby constrained relative to the carrier 36 and directly transmit the input rotation of the carrier 36 to the sun gear 46. The rotational motion of the sun gear 46 is further transmitted by the overrunning clutches 100 to the output hub 102 and the wheel spokes 104. With the cam channel concentric with the spindle, no speed change occurs across the transmission inasmuch as all of the rotating members are effectively locked together. Coasting with the chain pedals held motionless is possible with a minimum of transmission frictional drag as the overrunning clutches 100 allow the output hub 102 to turn easily on the sun gear shaft 48. Without this feature, coasting could be accommodated by disengagement of the pawls allowing the planets to rotate within the carrier.

When the cam channel 84 is eccentric to the spindle as the carrier revolves, each follower oscillates its radial position toward and away from the spindle. Since each axle is fixed in the carrier at a constant distance from the spindle, this causes each follower to oscillate its crank, i.e., to rotate the crank about its axle in one direction and subsequently in the opposite direction. Since the four axles are circumferentially equally spaced in the carrier, each crank is one-quarter of a cycle out of phase with its adjacent cranks.

So long as a crank rotates with a velocity opposite to, or at a velocity less than that of its planet, the crank pawls ride over the ratchet teeth in that planet. However, as the planet enters that quarter of a carrier revolution where the cam channel eccentricity imparts a rotational velocity to the crank which is in the same direction as, and which begins to exceed that of its planet, its pawls engage. For application of the drive as a bicycle transmission, virtually continuous engagement of the drive's input elements with the load is desirable, or the cyclist will sense engagements as unpleasant jerkiness in the pedals. Consequently a high resolution pawl and ratchet arrangement is shown here.

Only 2° of rotation of the crank in a direction opposite to the planet rotation can take place before a pawl engages inasmuch as the spacing of the five pawls equally divides the 10° angular span of one ratchet tooth. Thus for substantially a quarter of a carrier revolution, each of the four cranks is sequentially rotated relative to its planet so that its pawls engage. The engaged crank then drivingly rotates its planet about its axle in a direction opposite to the carrier rotation. This driving planet imparts to the meshing sun gear a rotational velocity equal to the velocity of the planet about its axle plus the rotational velocity of the carrier. The remaining planets are rotated by the sun gear at the same velocity as the driving planet, and thus their cranks are disengaged during this interval.

The planets sequentially drive the sun gear so that its resultant motion is substantially uniform corresponding approximately to the maximum rotational velocity of the planets superimposed on the velocity of carrier 36. The eccentricity of the cam channel 84 determines the output velocity and, hence, the speed and torque ratios of the drive.

The fixed nature of the cam channel 84 in this invention allows use of a variety of means for controlling its channel eccentricity. The cam eccentricity can be adjusted at any time by the cyclist with the manual control 110 shown in FIGS. 2, 4 and 5. The control 110 comprises a cable 112 attached at one end to the cam plate axle 82 by a pin 114 so that the axle 82 can be pivoted of hub 30 toward greater eccentricity against the forces exerted by the followers 80 which tend to pull the cam plate 88 toward zero eccentricity. A spring 116 is attached to ensure returning of the axle 82 to zero eccentricity when the tension in the cable 112 is released. The cable 112 is routed through a protective sheath 118 to a drum 120 in which the other end of the cable 112 is retained. The drum 120 is journaled on the hub of the adjacent locking plate 122 which itself is journaled on a cylindrical extension of the control support bracket 124 attached to the bicycle crossbar 126. Adjacent to the locking plate 122 and also journaled on the locking plate hub is a front plate 128 which is retained thereon by a washer 130 and a screw 132 threaded into the cylindrical extension of the bracket 124. A second screw 133 passed through an extension of the front plate 128 and threaded into an extension of the drum 120 pivotally supports a lever 134 for locking the drum 120 in a desired angular position.

A spring 136 integral with the front plate 128 urges the lever 134 to pivot so that its locking surface 138 bears against the locking plate 122. The lever locking surface 138 is curved so that increased bearing pressure is produced as the tension in the cable 112 is increased. The lever 134 is released allowing repositioning of the drum when the cyclist manually pivots the lever 134 in a counterclockwise direction as viewed in FIG. 4.

A control 140 sensitive to input speed for automatically adjusting the eccentricity of cam channel 84 to vary the transmission torque ratio may be provided as shown in FIG. 6 and FIG. 7. The control housing is supported from the spindle 12 and the rear fork 20. A U-shaped bracket 144 is spaced from and attached to the cam plate axle 82 by spacers 146 and screws 148. The ends of a link 150 are respectively pivotally connected to the bracket 144 and to the end of a threaded shaft 152 which is screwed into a hollow shaft 154 integral with a bevel pinion 156. The pinion shaft 154 is journaled by ball bearings 158 having an outer race 160 retained by the housing 142.

A location adjusting nut 162 and a locking nut 164 are threaded onto the pinion shaft 154. Meshing with the pinion 156 on the left side of the pinion axis is a left bevel gear 166, and on the right side, a right bevel gear 168. The right bevel gear 168 is fixed on a shaft 170 extending from the inner clutch race 172. The inner clutch race 172 is encircled by the outer clutch race 174 which has a hub journaled on the shaft 170. The left bevel gear 166 is fixed on the hub of the outer clutch race 174.

A pin 176 fixed in the housing 142 journals the shaft 170 and the control input sprocket 178. The input sprocket 178 supports a centrifugally responsive mechanism 180 between the inner and outer clutch races 172 and 174. The centrifugal mechanism 180 comprises two arcuate weights 182 each having an inner groove 184 running the entire inner circumference and an outer groove 186 running the entire outer circumference thereof. The weights are retained on a ring 188 which fits loosely and entirely within the inner circumference grooves 184 by a garter spring 190 which fits entirely within the outer circumference grooves 186. The ring 188 has two ears 192 mounted on pins 194 projecting from the input sprocket 178 so that when the sprocket 178 is motionless the inner circumference of the weights 182 contact the inner race 172. The input sprocket 178 may be driven by the same chain 108 which drives the transmission 10.

In operation, when the control input sprocket 178 is rotated at less than a predetermined speed, the weights 184 contact and rotate the inner race 172. The right bevel gear 168 rotates the pinion 154 so that the threaded shaft 152 is screwed from the pinion shaft 156 and the cam plate axle 82 is pushed to a position of lower eccentricity. When the control input sprocket 178 is rotated at greater than a predetermined speed the weights 184 contact and rotate the outer race 174. The left bevel gear 166 rotates the pinion 154 so that the threaded shaft 152 is screwed into the pinion shaft 156 and the cam plate axle 82 is pulled to a position of greater eccentricity. The centrifugal mechanism 180 is designed so that the weights are not engaged over the optimum pedalling speed range of a cyclist which is normally 50 to 60 revolutions per minute.

Thus if a cyclist pedalling within this optimum speed range encounters a hill and allows his pedalling speed to drop out of this range because of the increased torque required for pedalling, the speed control 140 will automatically and continuously downshift the transmission toward a lower input-to-output speed ratio until the input pedalling torque required is reduced so that the cyclist is again able to pedal in the optimum speed range. Opposite circumstances will produce upshifting.

Figure 10:
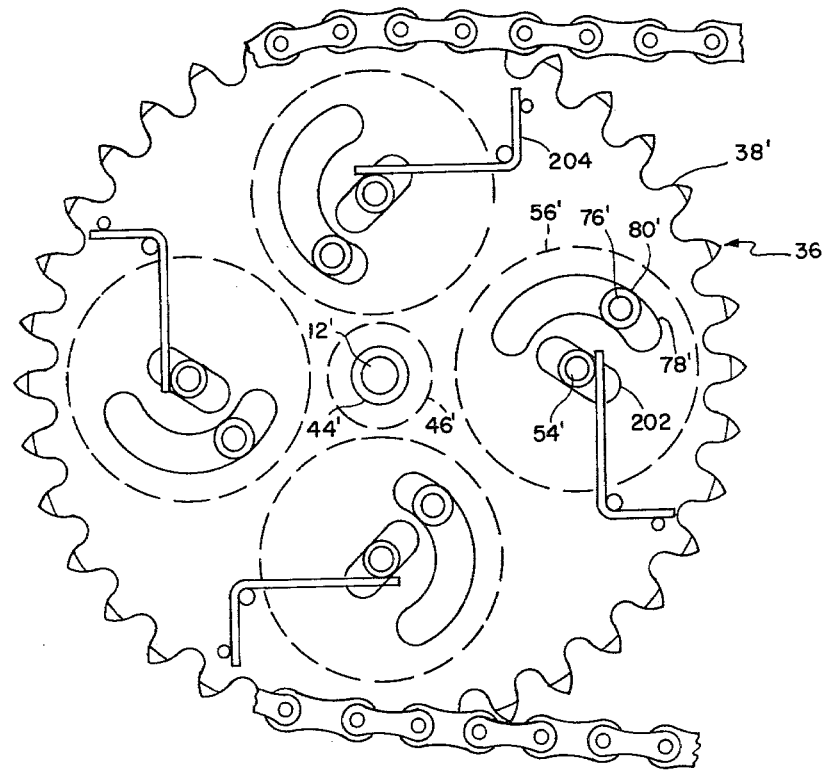
FIG. 10 is a section along the line 10—10 of FIG. 10.
Figure 11:
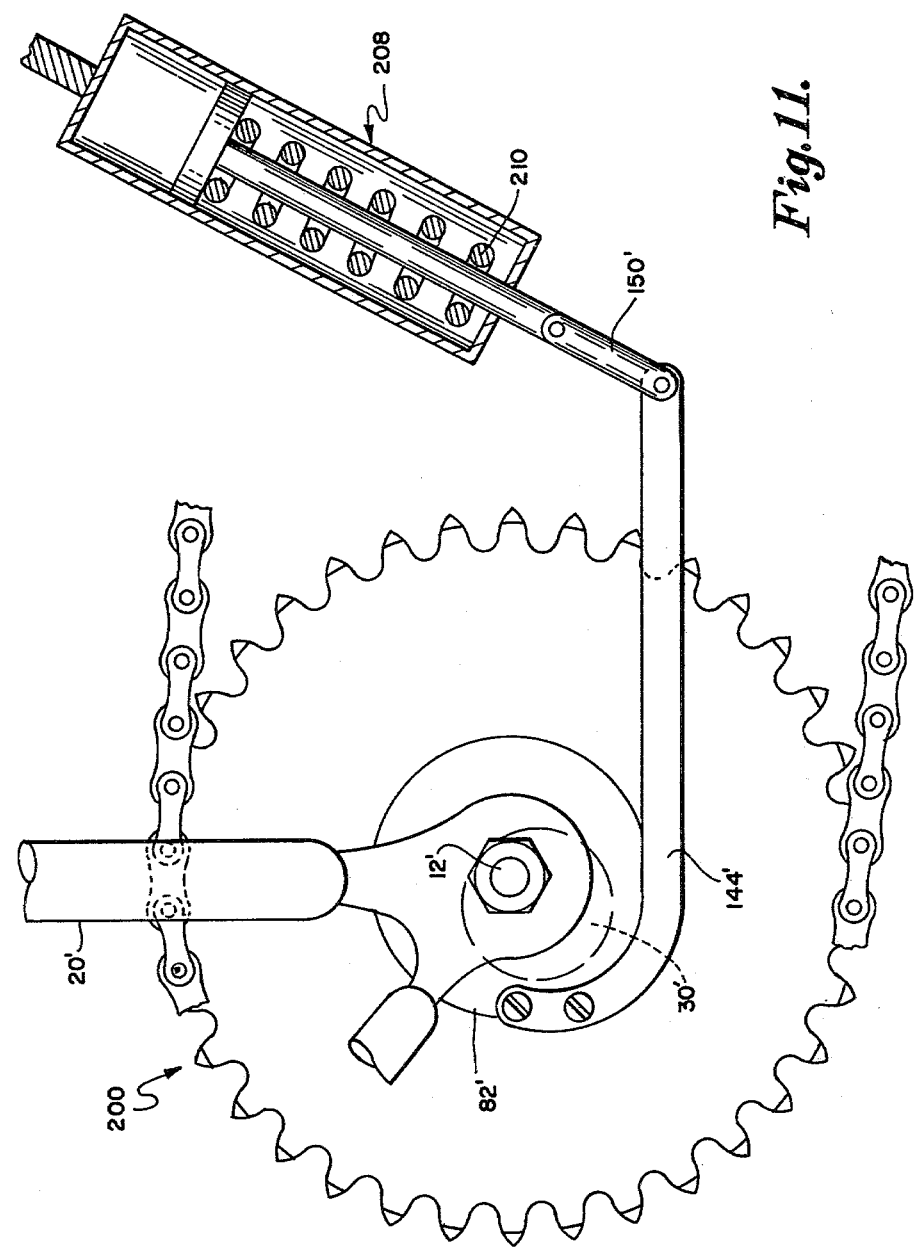
FIG. 11 is a section along the line 11—11 of FIG. 10.

Another embodiment of the invention illustrated in FIGS. 9-11 is the transmission 200. It is identical to the transmission 10 previously illustrated with the exception of the cranks and planetary gears. Each planet 56' is journaled on an axle 54' retained by the carrier 36' as previously described. The carrier 36' is comprised of the sprocket 38' and the left disk 40' screwed and having slots 202 in which the axles 54' can move to engage and disengage with the sun gear 46'. A crank pin 76' integral with the planet 56' protrudes through an arcuate slot 78' in the sprocket 38' and journals a follower 80' which engages the cam channel 84' contained in cam plate 88'. Thus a revolution of the carrier 36' causes a crank pin 76' to angularly oscillate its planet 56' about its axle 54' through one cycle.

By sequentially engaging each of the four planets with the sun gear only over a given portion of a carrier revolution, a speed increase, decrease or reversal can be accomplished. For instance, by sequentially engaging each of the planets with the sun gear over a portion of a carrier revolution where a planet has highest angular velocities in a direction common to the carrier rotation, a speed decrease, or even a speed reversal can be accomplished. However, for a bicycle transmission, a speed multiplication is desired. Thus by sequentially engaging each of the planets so that each planet drives the sun gear when that planet has highest angular velocities in a direction opposite to the carrier rotation, a speed multiplication is accomplished. By using four planets, as shown in FIG. 3, and sequentially engaging each planet for substantially a quarter of a revolution when each planet has highest angular velocities opposite to the carrier, a multiplied and substantially constant output speed is obtained.

Retained in a groove cut into the gear teeth on the planets 56' is a ring 74' of resilient material upon which the planets 56' noiselessly ride when not engaged with the sun gear 46'. Several means are provided to engage a planet over the desired driving quadrant, whereas disengagement tends to occur spontaneously as a planet leaves the driving quadrant because the planet and sun gear velocities are forced to become disparate.

One engagement means is to mount the transmission 200 with the rotational plane of the carrier 36' oriented vertically and with the geometric center of the cam plate axle 82' displaceable to maximum eccentricity to the left of the spindle 12'. With the carrier 36' rotating clockwise as seen in FIG. 10, and the crank pins 76' arranged to trail their respective planet axles 54', a planet 56' therefore rotates counterclockwise at maximum velocity when at the top of the carrier 36'. This is the center of the quadrant over which it is desired to have a planet drive the sun gear for the bicycle application. The slots for the planet axles are oriented so that as a planet enters the desired driving quadrant, gravity can bring the planet towards the sun gear. Moreover, with the crank pins arranged to follow the planet axles, the reactant cam force on the follower pushes the planet toward the sun gear as a planet enters the desired driving quadrant. Also, the frictional drag on the rim of the planet produced by the sun gear acts to pivot the planet about its crank pin into engagement with the sun gear. Additionally, springs 204 may be provided to urge the planets 56' against the sun gear 46'.

Any of the means already described for adjusting the cam channel eccentricity may be used to vary the speed and torque ratios of this embodiment. Yet another means, which automatically adjusts the cam channel eccentricity as a function of the torque applied across the transmission, equally applicable to both embodiments, is shown in FIG. 11. A U-bracket 144' is mounted to the cam channel and pivotally attached to a link 150' which in turn is pivotally attached to the plunger 206 of a dashpot 208. The dashpot 208 is fixedly mounted on any convenient rigid member of the bicycle frame.

The plunger 206 is loaded by a spring 210 so that as the cam plate axle 82' is moved from maximum to low eccentricity, an increasingly resistant force is applied. When a follower is turning a planet at highest velocities counter to the carrier velocity, the follower applies the highest forces experienced by the cam channel 84, in a direction from the center of the cam channel to the center of the follower. The center of the large cylindrical surface of the pivot hub 30', which is the effective pivot point for the cam plate axle 82', is offset from the line of action of the follower force so that the cam plate axle 82' is urged to pivot toward zero eccentricity. In operation, as the bicycle begins to climb a hill for instance, the output torque requirement increases and a greater force is applied by the followers against the cam channel. If the cyclist continues to pedal at the same rate, this increased force is balanced by the shifting of the cam plate axle 82' against the spring to lesser eccentricity. The decreased speed multiplication and increased torque multiplication of the transmission allow the cyclist to pedal at the same input torque as previously used, but, of course, with reduced output speed. Proper selection of the spring 210 will allow a cyclist to pedal at his optimum speed and torque while the transmission automatically adjusts to meet varying output torque requirements. The dashpot 208 is provided to prevent the transmission 200 from cyclically responding to the variable torque applied by the cyclist to the foot pedals during a revolution of the foot crank.

Although four planet gears have been shown in the drawings and mentioned in the description, the number used depends on the particular requirements of the application. In the case, for instance, where a single cylinder engine is employed to drive the transmission, a single planet, engaging the output gear during the power stroke of the engine may be used in conjunction with a flywheel for providing motion for the parasitic strokes.

Having thus described the invention, what is claimed as novel and desired to be secured by Letters Patent of the United States is:

1. Apparatus for adjusting the position of a threaded shaft according to the speed of a rotating member, said shaft being rotatably fixed but axially movable comprising:

a support housing;

a pinion gear mounted for rotation within the housing and having a cylindrical portion extending axially therefrom, said cylindrical portion having an axially oriented concentric receptacle which is threaded to receive the threaded shaft in operative engagement;

an axle mounted for rotation in the housing about an axis transverse to the axis of the pinion gear, said axle adapted to receive the rotating member for rotation thereon;

first and second bevel gears mounted for rotation on the axle and positioned to engage opposite sides of the pinion gear, so that, when the first bevel gear drives the pinion gear, the threaded shaft extends and, when the second bevel gear drives the pinion gear, the threaded shaft retracts;

inner and outer clutch races separately mounted for rotation on the axle and each constructed with axially extending radially spaced opposing flanges, said inner race connected to the first bevel gear for rotation therewith and said outer race connected to the second bevel gear for rotation therewith; and a centrifugal ring element constructed to radially expand or contract proportionally to speed, mounted on the rotating member for rotation therewith, said ring extending into the space between the flanges of the inner and outer clutch races and radially positioned therein to engage the inner race at relatively low rotational speeds and to engage the outer race at relatively high rotational speeds.

* * * * *

UNITED STATES PATENT AND TRADEMARK OFFICE
CERTIFICATE OF CORRECTION

PATENT NO. : 4,276,784
DATED : July 7, 1981
INVENTOR(S) : Clive Waddington

It is certified that error appears in the above-identified patent and that said Letters Patent are hereby corrected as shown below:

Column 7, line 23, it should read "plate axle 82'" after the word "cam", and the word ---channel--- should be deleted.

Signed and Sealed this

Fifteenth Day of September 1981

[SEAL]

Attest:

GERALD J. MOSSINGHOFF

Attesting Officer     Commissioner of Patents and Trademarks